(12) United States Patent
Harlocker

(10) Patent No.: US 7,077,534 B2
(45) Date of Patent: Jul. 18, 2006

(54) SOFT BOX ASSEMBLY AND POLE SUPPORT ASSEMBLY THEREFOR

(75) Inventor: Christopher R. Harlocker, Lake Forest, IL (US)

(73) Assignee: Calumet Photographic Inc., Chicago, IL (US)

( * ) Notice: Subject to any disclaimer, the term of this patent is extended or adjusted under 35 U.S.C. 154(b) by 208 days.

(21) Appl. No.: 10/817,703

(22) Filed: Apr. 2, 2004

(65) Prior Publication Data

US 2005/0225989 A1    Oct. 13, 2005

(51) Int. Cl.
*G03B 15/02* (2006.01)
*F21V 1/06* (2006.01)

(52) U.S. Cl. .................. 362/16; 362/18; 362/352

(58) Field of Classification Search ............ 362/16, 362/18, 352
See application file for complete search history.

(56) References Cited

U.S. PATENT DOCUMENTS

| | | | |
|---|---|---|---|
| 1,835,277 A | 12/1931 | Case | |
| 2,586,583 A | 2/1952 | Wagner | |
| 3,769,504 A | 10/1973 | Hesse et al. | |
| 3,781,535 A | 12/1973 | Larson | |
| 3,873,821 A | 3/1975 | Larson | |
| 4,052,607 A | 10/1977 | Larson | |
| 4,446,506 A | 5/1984 | Larson | |
| 5,183,329 A * | 2/1993 | Chen | 362/352 |
| 5,841,146 A | 11/1998 | Briese | |
| 6,030,087 A | 2/2000 | Whittle | |
| 6,076,935 A | 6/2000 | Kester | |
| 6,176,598 B1 | 1/2001 | Seligman et al. | |
| 6,604,844 B1 | 8/2003 | Hussey | |
| 6,709,121 B1 | 3/2004 | Lowe et al. | |
| 6,733,145 B1 * | 5/2004 | Shirilla | 362/16 |
| 2002/0075666 A1 | 6/2002 | Shirilla et al. | |
| 2003/0086272 A1 | 5/2003 | Waltz et al. | |

FOREIGN PATENT DOCUMENTS

WO    WO 94/18496    8/1994

* cited by examiner

*Primary Examiner*—Renee Luebke
*Assistant Examiner*—William Carter
(74) *Attorney, Agent, or Firm*—Pandiscio & Pandiscio; Scott R. Foster (57) ABSTRACT

A soft box assembly for disposition around a light source for illuminating a subject to be photographed, including a ring, a mounting member for disposition on the ring and pivotally connected to the ring, and movable between a first position in the plane of the ring and a second position angled from the plane, a flexible panel for disposition around the ring, poles for extending from the panel into the ring and the mounting member, and a lock for locking the mounting member and poles therein to the ring in the first position, whereby the poles extending from the panel are in part inserted into the ring and in part into the mounting member in the second position, and the mounting member is pivotally moved to the first position and locked, such that all the poles are held in axial compression between the mounting member and the panel.

22 Claims, 8 Drawing Sheets

SOFT BOX ASSEMBLY AND POLE SUPPORT ASSEMBLY THEREFOR

BACKGROUND OF THE INVENTION

1. Field of the Invention

This invention relates to the provision of suitable lighting for photography and is directed more particularly to a soft box assembly for disposition around a light source used to illuminate a subject to be photographed.

2. Description of the Prior Art

It is known in photography to use light reflectors, known as "soft boxes" to obtain even light diffusion from a light source, commonly a light bulb. Such devices typically include a panel of flexible material, usually a metallized cloth, which is provided with an open central portion and an outer perimeter. A pole support assembly is disposed in the panel open central portion and is adapted to receive inner ends of poles which extend outwardly from the support assembly and connect to portions of the panel, to maintain the panel in the preferred stretched configuration. The support assembly attaches to a light source support or housing, such that the panel surrounds and extends outwardly from the light source and serves to project diffused lighting on photographic subjects.

The aforementioned poles usually are somewhat flexible and tend to hold the panel in a taut, stretched condition. Inasmuch as the poles, when properly placed for support of the panel, are under axial compression, setting up or taking down the soft box assembly can be problematic in that inserting or removing the poles usually is a bit of a struggle. Given that time is of the essence in some instances, as in news photography, there is a need for a soft box assembly which can be easily and quickly set up and taken down.

SUMMARY OF THE INVENTION

An object of the invention is, therefore, to provide a soft box assembly including a pole support assembly which easily receives the inner ends of poles which are connected at their outer ends to a light reflective panel, and which can be manipulated to bring all the poles disposed therein into their panel supporting positions and which automatically locks in the desired position.

A further object of the invention is to provide in a soft box assembly a pole support assembly which includes a movable member which readily accepts the inner ends of panel supporting poles and is manipulable to move the poles into panel supporting positions, and which locks into place with the poles held thereby in their panel supporting positions.

A still further object of the invention is to provide a support assembly for a plurality of poles extendible from a central area of a flexible panel generally radially outwardly to outer portions of the flexible panel, the support assembly being adapted for disposition in an opening in a central area of the panel, further adapted to receive inner ends of the poles, and manipulable to bring the poles into their panel supporting positions and to lock the poles in those positions.

With the above and other objects in view, a feature of the invention is the provision of a soft box assembly for disposition around a light source for illuminating a subject to be photographed. The assembly includes a pole support assembly comprising a rigid ring, a mounting member for disposition on a portion of an outer surface of the ring, the mounting member being pivotally connected to the ring and movable between a first position generally in the plane of the ring, and a second position angled from the plane of the ring, a flexible panel having an open central portion of greater area than the pole support assembly, the poles being adapted to extend from the panel into the pole support assembly, and a lock for locking the mounting member and the poles therein to the ring when the mounting member is in the first position. Accordingly, a plurality of the poles extending from the panel may be inserted into the ring and a further pole may be inserted into the mounting member when the mounting member is in the second position, and the mounting member may be pivotally moved to the first position and locked therein, such that all of the poles are held in axial compression between the pole support assembly and the panel.

In accordance with a further feature of the invention, there is provided a soft box assembly for disposition around a light source for illumination of a subject to be photographed. The assembly includes a rigid ring having protrusions extending radially outwardly, some of the outwardly extending protrusions having bores extending radially inwardly from outer surfaces thereof, a mounting member adapted for disposition on a portion of the outer surfaces of the ring, the mounting member having inwardly extending protrusions and bores extending inwardly from an outer surface of the mounting member into the inwardly extending protrusions. The mounting member is pivotally connected to the rigid ring at ends of the mounting member and is pivotally movable between (i) a first position in generally the same plane as the rigid ring and generally circumferential thereof with the mounting member inwardly extending protrusions being offset from the rigid ring outwardly extending protrusions and (ii) a second position angled from the plane of the rigid ring. There are further provided a flexible soft box panel having an open central portion larger than the rigid ring and the mounting member, first poles adapted to extend from the panel into the rigid ring inwardly extending bores, second poles adapted to extend from the panel into the mounting member inwardly extending bores, and a lock mechanism for locking the mounting member, with the poles therein, to the rigid ring in the mounting member first position. Thus, the second poles extending from the panel may be inserted into the mounting member inwardly extending bores when the mounting member is in the second position, and the mounting member may be pivotally moved to the first position and locked in the first position to the rigid ring such that the first poles are held in axial compression between the ring and the panel and the second poles are held in axial compression between the mounting member and the panel.

In accordance with a further feature of the invention, there is provided a soft box assembly having a flexible panel supported by a plurality of poles extending from the panel to a support assembly disposed in an opening centrally of the panel, the support assembly comprising a rigid ring, a mounting member for disposition on a portion of an outer surface of the ring, the mounting member being pivotally connected to the ring and movable between a first position generally in the plane of the ring, and a second position angled from the plane of the ring, the poles being adapted to extend from the panel into the support assembly, and a lock for locking the mounting member and the poles therein to the ring when the mounting member is in the first position. Thus, a first portion of the poles extending from the panel may be inserted into the ring, and a second portion of the poles extending from the panel may be inserted into the mounting member when the mounting member is in the second position, and the mounting member may be pivotally moved to the first position and locked therein, such that the first and second portions of the poles are held in axial compression between the mounting member and the panel.

In accordance with a still further feature the invention, there is provided a soft box assembly having a flexible panel supported by a plurality of poles extending from the panel to a support assembly disposed in an opening centrally of the panel, the support assembly comprising a rigid ring having protrusions extending radially outwardly, some of the outwardly extending protrusions having bores extending radially inwardly from outer surfaces thereof, a mounting member adapted for disposition on a portion of an outer surface of the ring, the mounting member having inwardly extending protrusions and bores extending inwardly from an outer surface of the mounting member into the inwardly extending protrusions, the mounting member being pivotally connected to the rigid ring at ends of the mounting member and being pivotally movable between (i) a first position in generally the same plane as the rigid ring and generally circumferential thereof with the mounting member inwardly extending protrusions being offset from the rigid ring outwardly extending protrusions, and (ii) a second position angled from the plane of the rigid ring, and a lock mechanism for locking the mounting member, with the poles therein, to the rigid ring in the mounting member first position. Accordingly, a first plurality of the poles extending from the panel may be inserted into the ring inwardly extending bores and a second plurality of the poles extending from the panel may be inserted into the mounting member inwardly extending bores when the mounting member is in the second position, and the mounting member may be pivotally moved to the first position and locked in the first position to the rigid ring such that the poles are held in axial compression between the support assembly and the panel.

In accordance with a still further feature, there is provided a support assembly for a plurality of poles to extend from a central area of a flexible panel generally radially outwardly to outer portions of the poles to portions of the flexible panel to maintain the panel in a spread open configuration, the support assembly being adapted for disposition in an opening in the central area of the panel and being adapted to receive and retain inner ends of the poles. The support assembly comprises a rigid ring having bores therein for receiving the inner end of a first plurality of the poles, a rigid mounting member for disposition on a portion of an outer surface of the ring, the mounting member being pivotally connected to the ring and pivotally movable between a first position generally in the plane of the ring and in the disposition on the portion of the outer surface of the ring, and a second position angled from the plane of the ring, the mounting member having bores therein for receiving the inner ends of a second plurality of the poles, and a lock for locking the mounting member to the ring when the mounting member is in the first position. Thus, the inner ends of the first plurality of the poles extending inwardly from the panel may be inserted into the ring, and inner ends of the second plurality of the poles may be inserted into the mounting member when the mounting member is in the second position, and the mounting member is pivotally movable to the first position and locked therein, such that the first and second pluralities of pole inner ends are fixed in the central area of the panel.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
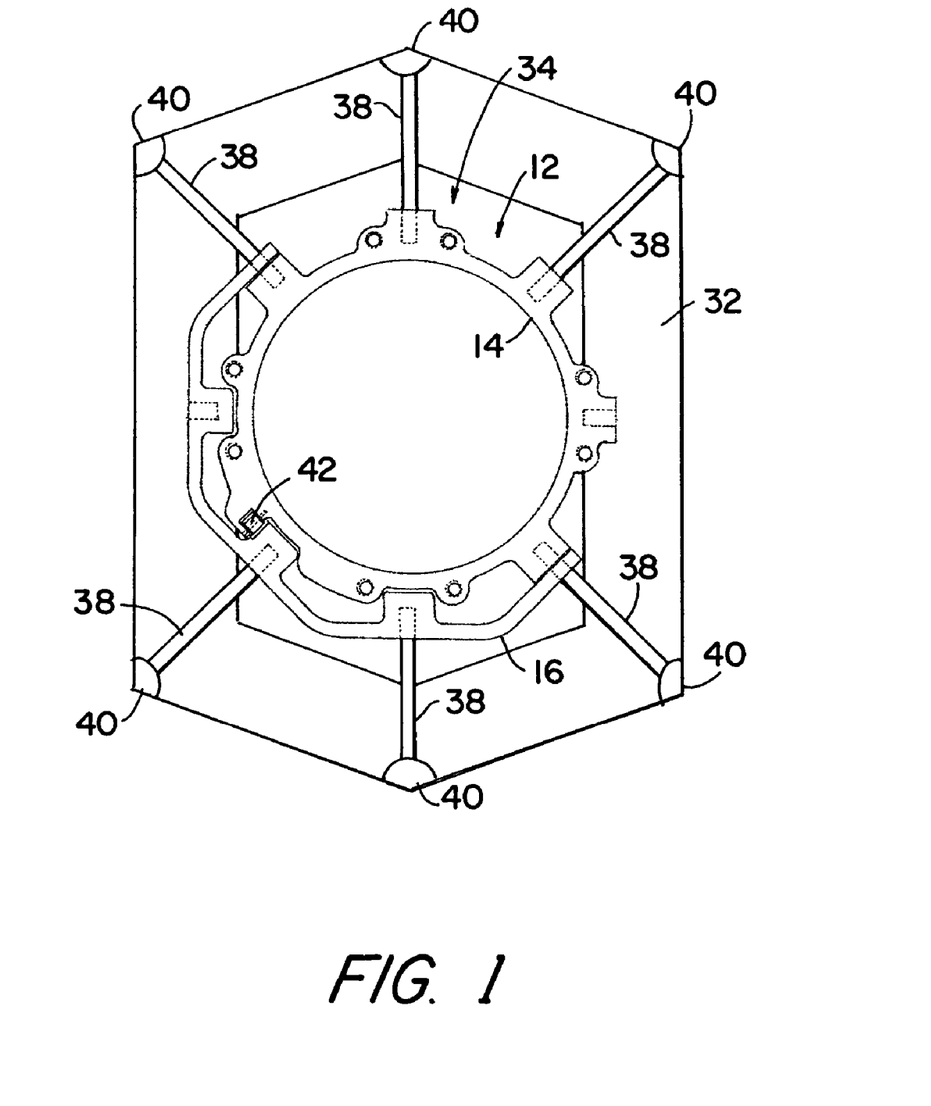
FIG. 1 is an elevational view of one form of a soft box assembly illustrative of an embodiment of the invention.

Referring to FIG. 1, it will be seen than an illustrative soft box assembly 10 includes a pole support assembly 12, which in turn includes a rigid ring 14 and a mounting member 16 pivotally connected to the ring 14.

The ring 14 is provided with radially outwardly extending protrusions 18 (FIG. 2), each provided with an inwardly extending bore 20 adapted to receive an inner pole end.

Figure 2:
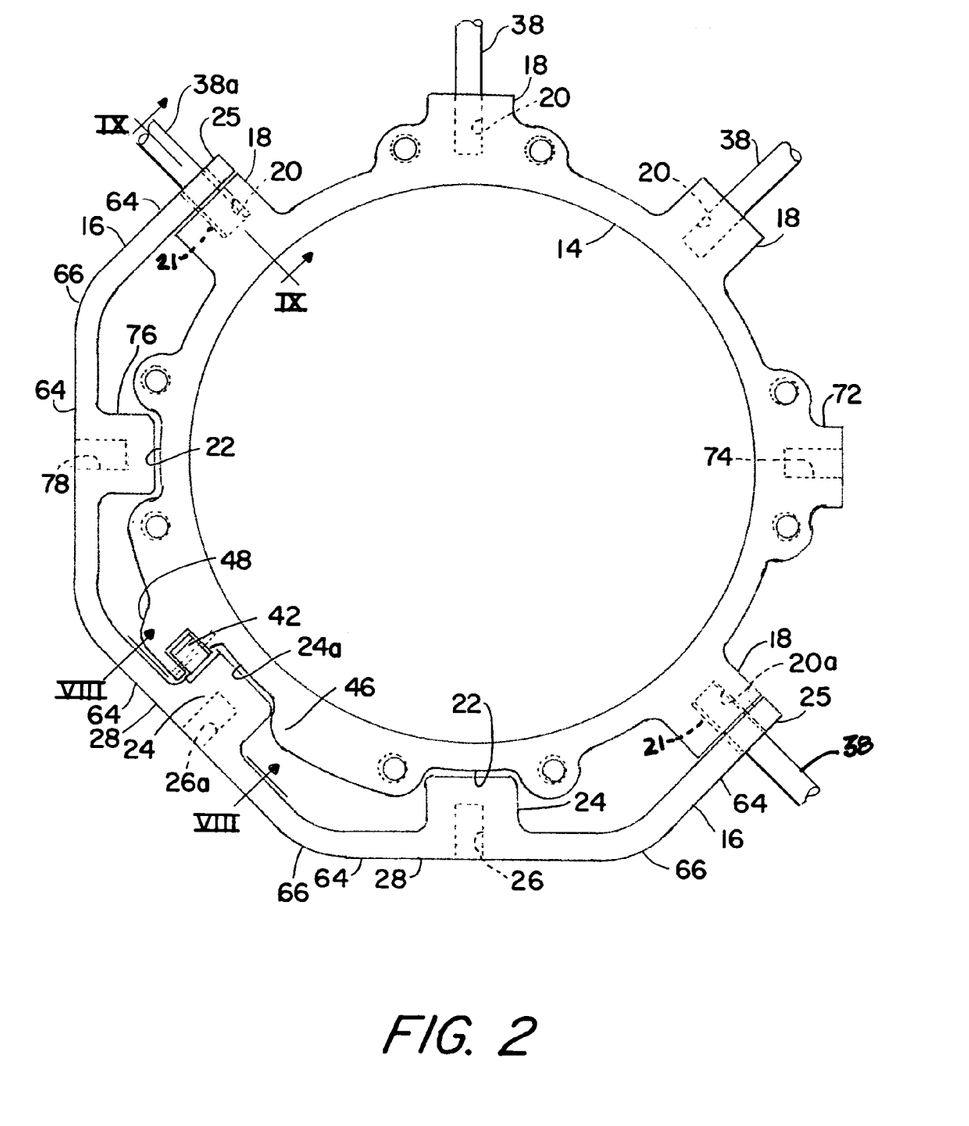
FIG. 2 is an elevational view of a pole support assembly portion of the soft box assembly shown in FIG. 1, the pole support assembly being shown with a movable element in a first position.

The mounting member 16 is pivotally connected at ends 25 thereof to the ring 14 and is adapted for disposition on a portion of an outer surface 22 of the ring. The mounting member 16 is provided with radially inwardly directed protrusions 24, each having therein a bore 26 extending from an outer surface 28 of the mounting member.

Figure 3:
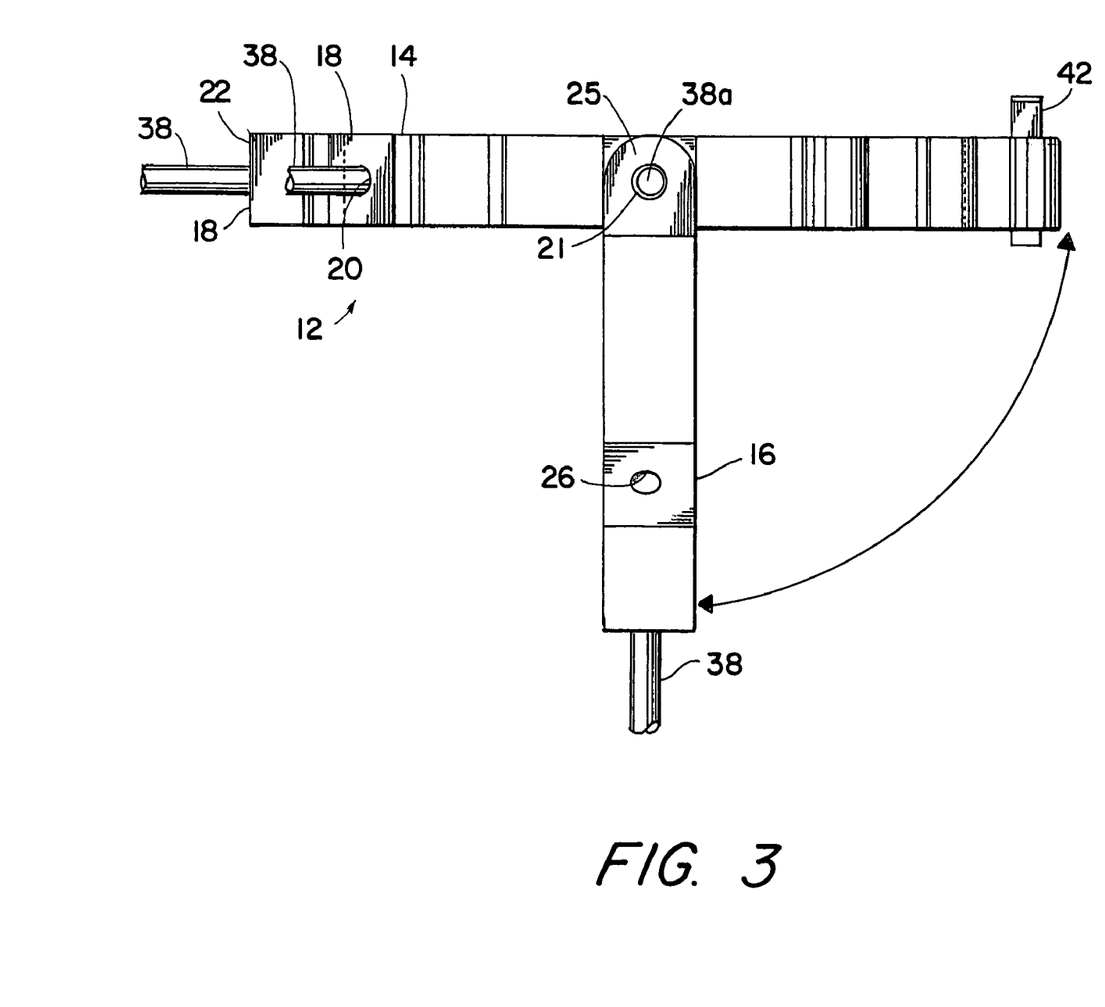
FIG. 3 is a side elevational view showing the movable element in a second position.
Figure 4:
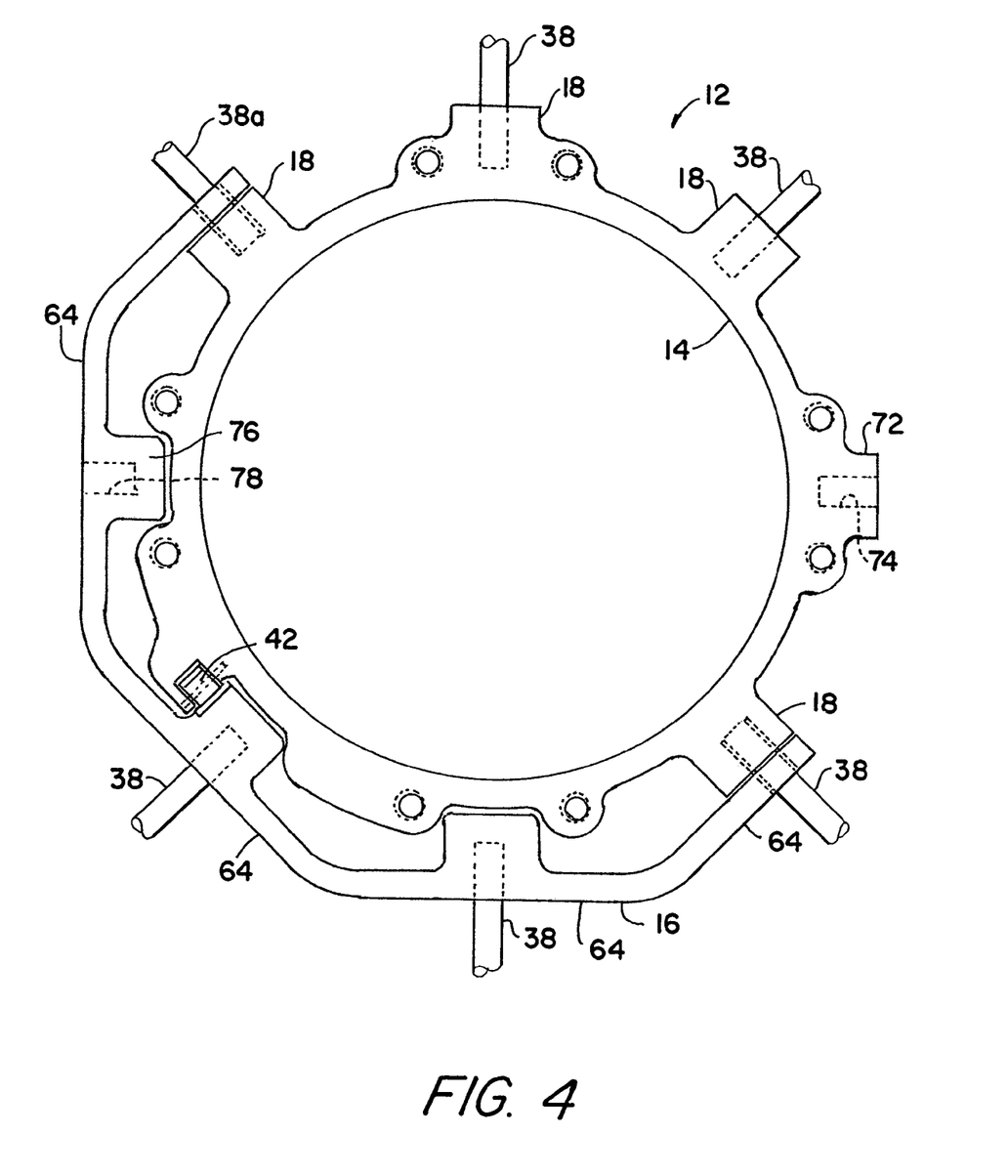
FIG. 4 is an elevational view similar to FIG. 2, but showing the pole support with six poles extending therefrom to support the hexagonal soft box reflector of FIG. 1.

The mounting member 16 is pivotally movable between a first position generally in the plane of the ring 14 (FIGS. 1 and 2) and a second position removed from the plane of the ring and angled thereto, one such position being shown in FIG. 3.

Figure 9:
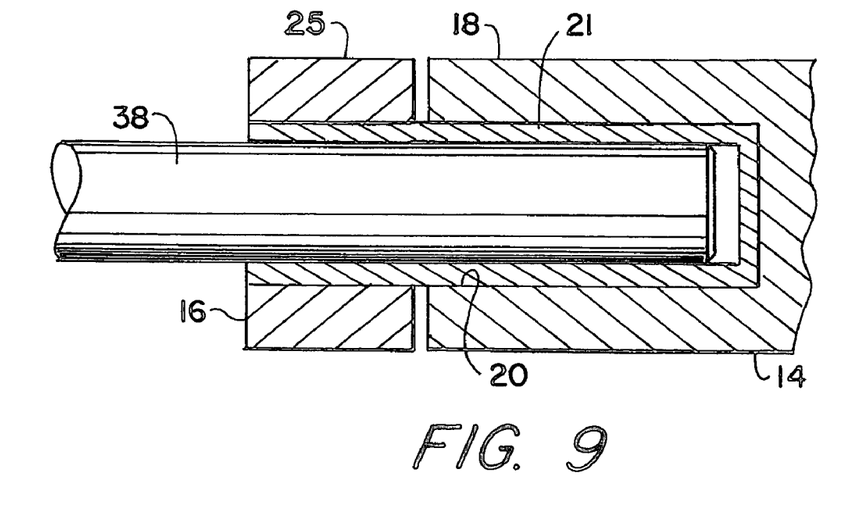
FIG. 9 is a sectional view taken along line IX—IX of FIG. 2.

As shown in FIGS. 2 and 9, the pivotal connections between the mounting member 16 and the ring 14 are provided by cylindrical tubes 21 extending through each end 25 of the mounting member 16 and into one of the bores 20 in one of the ring protrusions 18. The inside diameter of the tube 21 is such as to accept one of the inner pole ends.

The ring 14 and the mounting member 16 are preferably of aluminum, or an alloy thereof, or of a hard heat-resistant plastics material.

Figure 5:
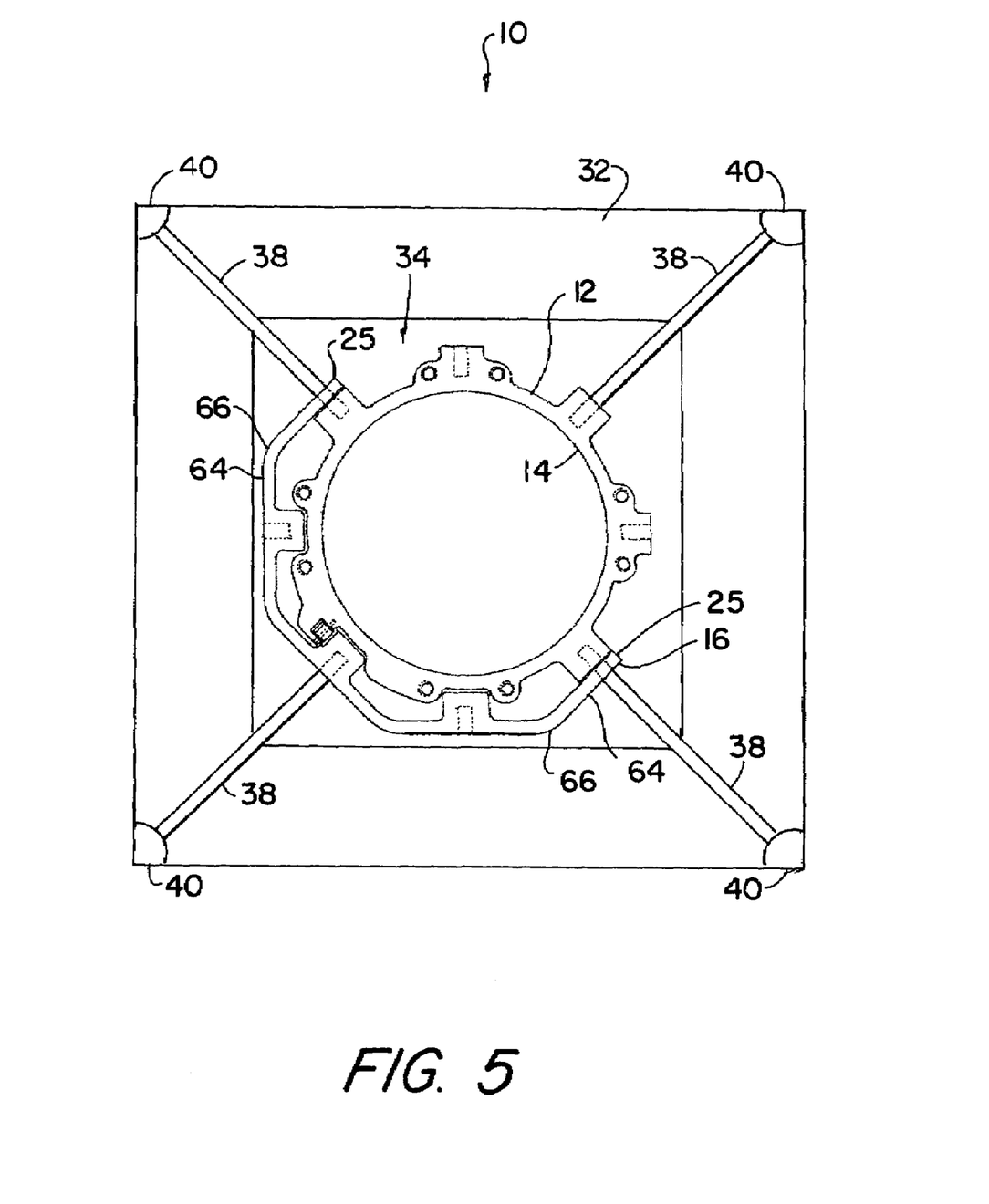
FIG. 5 is an elevational view of another form of soft box assembly; illustrative of an alternative embodiment.

The soft box assembly 10 further includes a flexible panel 32 having an open central portion 34 which preferably is of an area generally larger than the area of the pole support assembly 12, as shown in FIG. 5, such that the pole support assembly can be disposed in the panel open central portion 34.

The panel 32 typically is of a cloth fabric, preferably a metallized fabric, such as canvas.

The soft box assembly 10 still further includes a plurality of poles 38 (FIG. 1) adapted to extend from the pole support assembly 12 to portions 40 of the panel 32. The poles 38 are sufficiently rigid to stretch the panel to provide a smooth surface, but sufficiently flexible to bend slightly under the axially compressive forces applied to the poles when they are in their operative positions.

Figure 8:
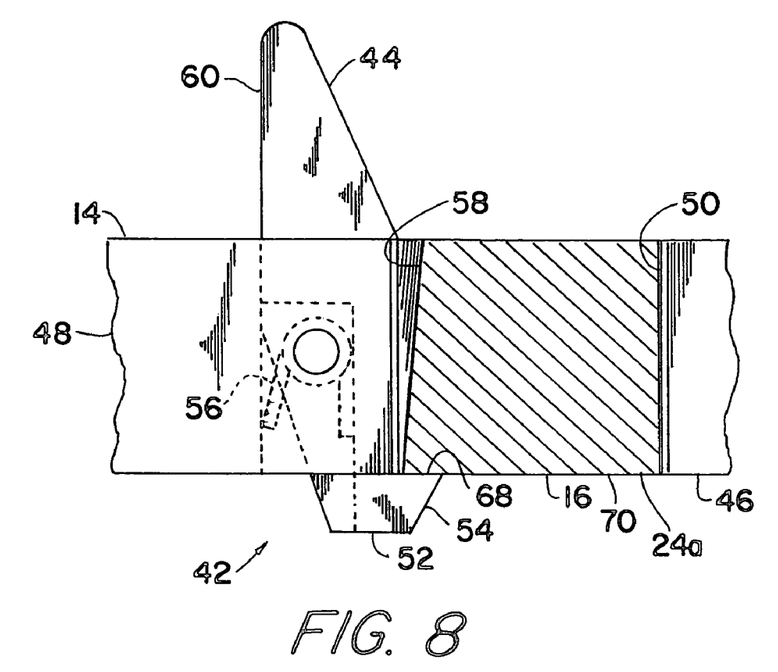
FIG. 8 is a sectional view taken along line VIII—VIII of FIG. 2 and showing a lock portion of the support assembly.

The ring 14 is provided with a lock mechanism 42 for locking the mounting member 16 to the ring 14 when the mounting member is moved into the plane of the ring. The locking mechanism 42 comprises a lever 44 (FIG. 8) pivotally mounted on the ring 14. Ring protrusions 46 and 48 (FIGS. 2 and 8) define a gap 50 and the lever 44 is mounted in one side of the gap. The lever 44 includes a head portion 52 provided with a cam surface 54. The lever head portion 52 is biased toward the gap 50 by a spring 56 (FIG. 8). As the mounting member 16 approaches the plane of the ring 14, one of the mounting member protrusions 24a engages the lever head portion cam surface 54, moving the lever head portion 52 away from the gap 50, against the bias of the spring 56. The protrusion 24a includes an engagement recess 58 against which the spring-biased lever cam surface 54 is pressed. An undercut portion 68 of the head portion 52 snaps over a mounting member surface 70 to retain the protrusion 24a in the gap 50, thereby to hold the mounting member 16 in place on the ring in the general plane of the ring. The lever is provided with a pusher portion 60 which can be manipulated by hand to release the mounting member from the ring.

The ring 14 is provided with a protrusion 76 (FIG. 2) having a threaded bore 74 extending therethrough for affixing the ring onto the light source support, housing or other fitting (not shown).

Similarly, an oppositely disposed protrusion 76 extending inwardly from the mounting member 16 is provided with a threaded bore 78 for affixing to the light source support, housing, or fitting associated therewith for such purposes.

As seen in the drawings, the mounting member 16 can comprise a plurality of straight segments 64 (FIG. 2), each joined to another straight segment by a curved segment 66. The bores 26, 78 in the mounting member 16 are each disposed in one of the straight segments. 64.

In operation, a first plurality of the poles 38 are connected to the panel portions 40 at the outer ends of the poles. The inner ends of the first plurality of poles are inserted into the bores 20 of the ring 14, one of the poles 38a extending through an end 25 of the mounting member 16. The insertion of the inner ends of the first plurality of poles is relatively easy because the panel is not yet stretched and the poles are under virtually no compressive force.

The mounting member 16 is then pivotally moved to an angled position. The outer ends of a second plurality of poles 38 are set in the panel 32 and the inner ends of the second poles are inserted into the mounting member bores 26 and the bore 20a of the ring 14 (FIG. 2). Inasmuch as the mounting member is angled in a direction away from the panel, there is room between the panel and the mounting member to easily insert the inner ends of the poles into the bores 26, 20a, the poles being under no compressive force.

Figure 6:
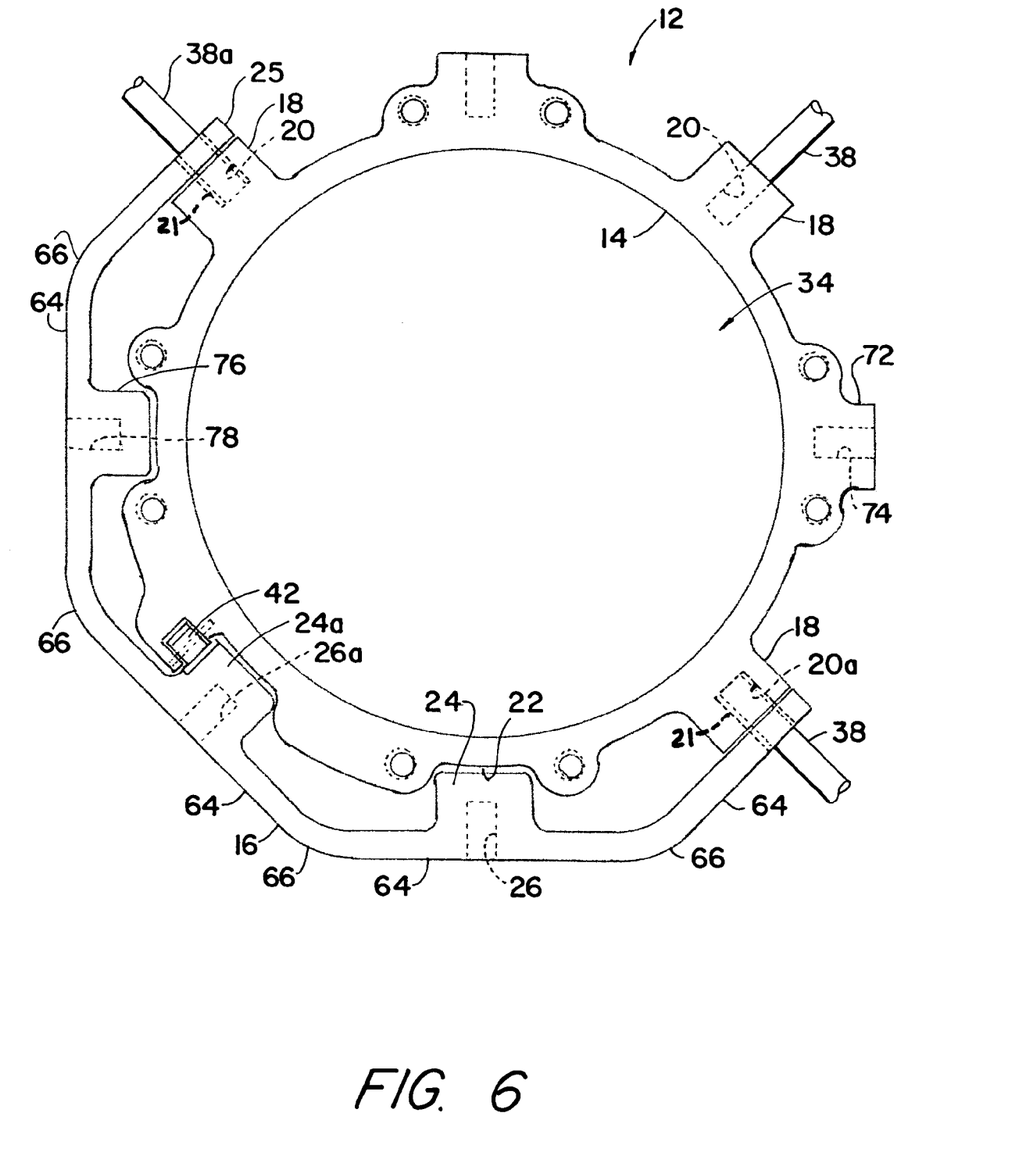
FIG. 6 is an elevational view of the pole support assembly of FIG. 2, shown in use for the square soft box reflector shown in FIG. 5.

Once the inner ends of the poles are disposed in the mounting member bores 26 and the ring bore 20a, the mounting member is moved toward the ring, against increasing resistance, until the mounting member engages the lock mechanism 42, to secure the mounting member to the ring, with all the poles (FIG. 6) securely locked in place by the axial compression exerted thereon by the panel 32.

To release the poles, the lock pusher portion 60 is manually engaged, releasing the mounting ring and allowing easy removal of the poles which are no longer under axial compression.

Figure 7:
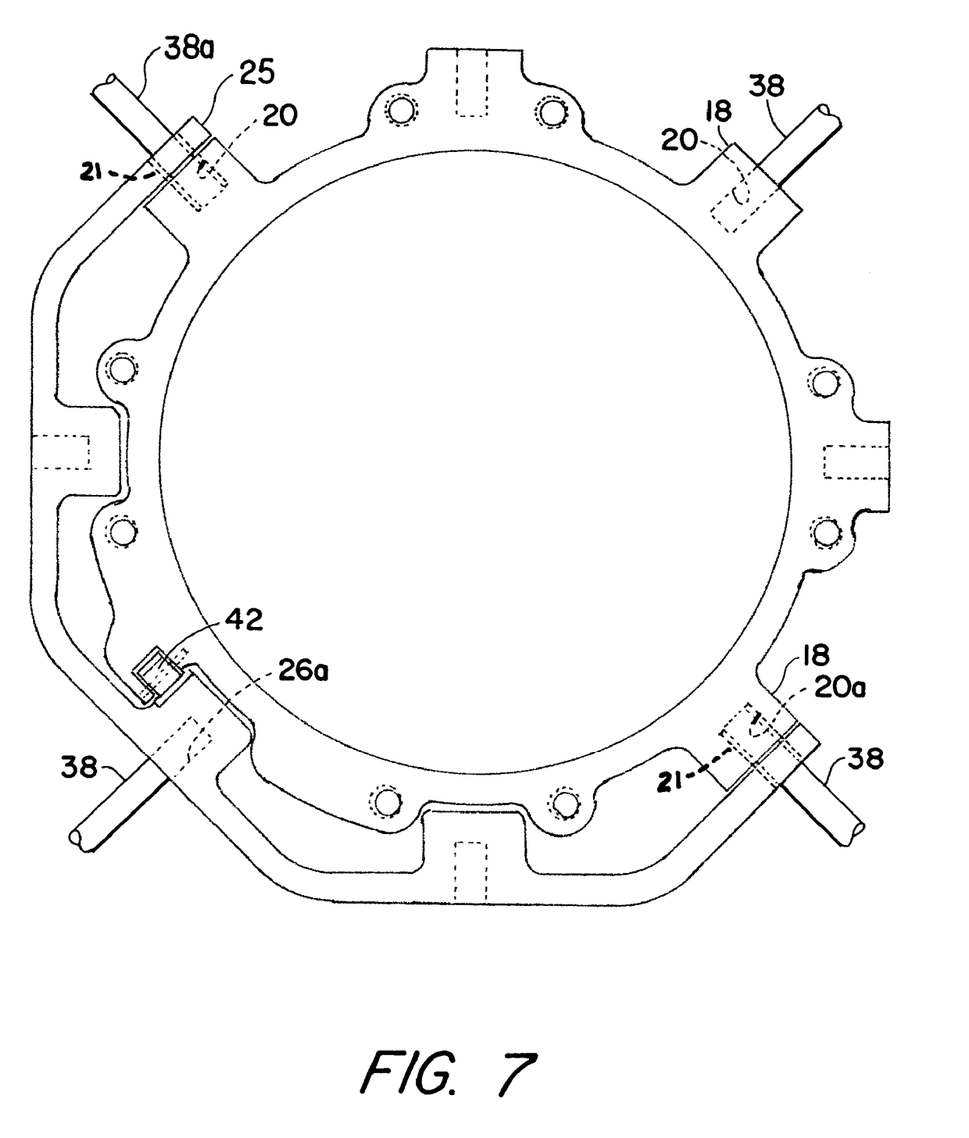
FIG. 7 is an elevational view similar to FIG. 6, showing all poles in place for the soft box reflector of FIG. 5.

Referring to FIG. 5, it will be seen that the panel 32 may be of a rectangular configuration, requiring only four poles 38. In such event, two poles 38, including pole 38a (FIG. 6) are inserted, respectively, in bores 20 in ring protrusions 18. The mounting member 16 is then pivotally moved away from the plane of the ring 14 to permit the other two poles 38 to be inserted into the bore 20a and the bore 26a (FIG. 7), respectively.

There is thus provided a soft box assembly including a pole support assembly which easily receives the inner ends of poles connected at their outer ends to a light reflective panel.

It will be understood that many additional changes in the details, materials, steps and arrangements of parts, which have been herein described and illustrated in order to explain the nature of the invention, may be made by those skilled in the art within the principles and scope of the invention or expressed in the appended claims.

What is claimed is:

1. A soft box assembly for disposition around a light source for illumination of a subject to be photographed, the soft box assembly comprising:
   a pole support assembly comprising:
      a rigid ring defining a plane; and
      a mounting member for disposition on a portion of an outer peripheral surface of said ring, said mounting member defining a plane and being generally D-shaped and pivotally connected to said ring at ends of said mounting member and movable between a first position in the plane of said ring, and a second position wherein the plane of said mounting member is angled from the plane of said ring;
   a flexible panel having an open central portion of greater area than said pole support assembly;
   poles adapted to extend from said panel into said pole support assembly; and
   a lock mechanism for locking said mounting member and said poles therein to said ring when said mounting member is in the thirst position;
   whereby a plurality of said poles extending from said panel may be inserted into said ring, and a further pole extending from said panel may be inserted into said mounting member when said mounting member is in the second position, and said mounting member may be pivotally moved to the first position and locked therein, such that all of said poles are held in axial compression between said pole support assembly and said panel.

2. A soft box assembly for disposition around a light source for illumination of a subject to be photographed, the assembly comprising:
   a rigid ring having protrusions extending radially outwardly, some of the outwardly extending protrusions having bores extending radially inwardly from outer surfaces thereof;
   a mounting member adapted for disposition on a portion of an outer surface of said ring, said mounting member having inwardly extending protrusions and bores extending inwardly from an outer surface of said mounting member into the inwardly extending protrusions;

said mounting member being pivotally connected to said rigid ring at ends of said mounting member and being pivotally movable between a first position in generally the same plane as said rigid ring and generally circumferential thereof, with the mounting member inwardly extending protrusions being offset from the rigid ring outwardly extending protrusions, and a second position angled from the plane of said rigid ring;

a flexible soft box panel having an open central portion larger than said rigid ring and said mounting member;

first poles adapted to extend from said panel into the rigid ring inwardly extending bores;

second poles adapted to extend from said panel into the mounting member inwardly extending bores; and a lock mechanism for locking said mounting member, with said second poles therein, to said rigid ring in the mounting member first position;

whereby said second poles extending from said panel may be inserted into said mounting member inwardly extending bores when said mounting member is in the second position, and said mounting member may be pivotally moved to the first position and locked in the first position to said rigid ring, such that said first poles are held in axial compression between said ring and said panel and said second poles are held in axial compression between said mounting member and said panel.

3. The assembly in accordance with claim 1 wherein said lock mechanism is mounted on said rigid ring and is engageable by said mounting member and moved by said mounting member into a locking position.

4. The assembly in accordance with claim 3 wherein said lock mechanism comprises a spring biased lug engageable with said mounting member.

5. The assembly in accordance with claim 4 wherein said spring biased lug is pivotally mounted on said ring.

6. The assembly in accordance with claim 5 wherein said lug is provided with a surface engageable by an operator to release the mounting member from locking engagement with said rigid ring.

7. The assembly in accordance with claim 2 wherein said poles are adapted to be flexed under the axial compression.

8. The assembly in accordance with claim 2 wherein said assembly is provided with connectors for affixing said assembly to the light source.

9. The assembly in accordance with claim 8 wherein the connectors comprise threaded bores extending through said rigid ring and said mounting member.

10. The assembly in accordance with claim 2 wherein said mounting member extends about half way around said ring when in the first position.

11. The assembly in accordance with claim 10 wherein said mounting member comprises a plurality of straight segments each joined to another straight segment by a curved segment.

12. The assembly in accordance with claim 11 wherein the bores in the outer surface of said mounting member are each disposed in one of said straight segments.

13. The assembly in accordance with claim 2 wherein said rigid ring and said mounting member are of a selected one of a metal and a hard plastics material.

14. The assembly in accordance with claim 13 wherein the metal is a selected one of aluminum and aluminum alloy.

15. The assembly in accordance with claim 2 wherein said panel is of cloth.

16. The assembly in accordance with claim 15 wherein the cloth comprises a canvas type material.

17. The assembly in accordance with claim 15 wherein the cloth comprises a metallized cloth.

18. The support assembly in accordance with claim 2 wherein the bores of said ring and said mounting member are adapted to receive a number of poles to support a flexible panel of a polygonal configuration.

19. In a soft box assembly having a flexible panel supported by a plurality of poles extending from the panel to a support assembly disposed in an opening centrally of the panel, the support assembly comprises:

a rigid ring defining a first plane;

a generally D-shaped mounting member for disposition on a portion of an outer peripheral surface of said ring, said mounting member defining a second plane and being pivotally connected at ends thereof to said ring and movable between a first position generally in the plane of said ring, and a second position in which the plane of said mounting member is angled from the plane of said ring, the poles being adapted to extend from the panel into said support assembly; and a lock mechanism for locking said mounting member and said poles therein to said ring when said mounting member is in the first position;

whereby a first portion of the poles extending from the panel may be inserted into said ring, and a second portion of the poles extending from the panel may be inserted into said mounting member when said mounting member is in the second position, and said mounting member may be pivotally moved to the first position and locked therein, such that the poles are held in axial compression between said mounting member and the panel.

20. In a soft box assembly having a flexible panel supported by a plurality of poles extending from the panel to a support assembly disposed in an opening centrally of the panel, the support assembly comprises:

a rigid ring having protrusions extending radially outwardly, some of the outwardly extending protrusions having bores extending radially inwardly from outer surfaces thereof;

a mounting member adapted for disposition on a portion of an outer surface of said ring, said mounting member having inwardly extending protrusions and bores extending inwardly from an outer surface of said mounting member into the inwardly extending protrusions;

said mounting member being pivotally connected to said rigid ring at ends of said mounting member and being pivotally movable between (i) a first position in generally the same plane as said rigid ring and generally circumferential thereof with the mounting member inwardly extending protrusions being offset from the rigid ring outwardly extending protrusions, and (ii) a second position angled from the plane of said rigid ring;

a lock mechanism for locking said mounting member, with the poles therein, to said rigid ring in the mounting member first position;

whereby a first plurality of the poles extending from the panel may be inserted into said ring inwardly extending bores, and a second plurality of the poles extending from the panel may be inserted into said mounting member inwardly extending bores when said mounting member is in the second position, and said mounting member may be pivotally moved to the first position and locked in the first position to said rigid ring, such that the poles are held in axial compression between said support assembly and the panel.

21. The support assembly in accordance with claim 20 wherein said mounting member is pivotally connected to said rigid ring at each end of said mounting member by connection structure including a sleeve adapted to receive one of said poles.

22. A support assembly for a plurality of poles to extend from a central area of a flexible panel generally radially outwardly to outer portions of the flexible panel to maintain the panel in a spread open configuration, the support assembly being adapted for disposition in an opening in the central area of the panel and being adapted to receive an retain inner ends of the poles, the support assembly comprising:

a rigid ring defining a first plane and having bores therein for receiving the inner ends of a first plurality of the poles;

a generally D-shaped rigid mounting member for disposition on a portion of a peripheral outer surface of said ring, said mounting member defining a second plane and being pivotally connected to said ring at ends of said mounting member and pivotally movable between (i) a first position wherein the second plane is generally in the first plane of said ring and in the disposition on the portion of the peripheral outer surface of said ring, and (ii) a second position wherein the mounting member second plane is angled from the first plane of said ring, the mounting member having bores therein for receiving the inner ends of a second plurality of the poles; and a lock mechanism for locking said mounting member to said ring when said mounting member is in the first position;

whereby the inner ends of the first plurality of the poles extending inwardly from the panel may be inserted into said ring, and inner ends of the second plurality of the poles may be inserted into said mounting member when said mounting member is in the second position, and said mounting member is pivotally movable to the first position and locked therein, such that the first and second pluralities of poles inner ends are fixed in the central area of the panel.

* * * * *